May 5, 1953
J. F. SHANNON
2,637,342
FLUID PRESSURE CONTROL
Filed Oct. 22, 1948
3 Sheets-Sheet 1
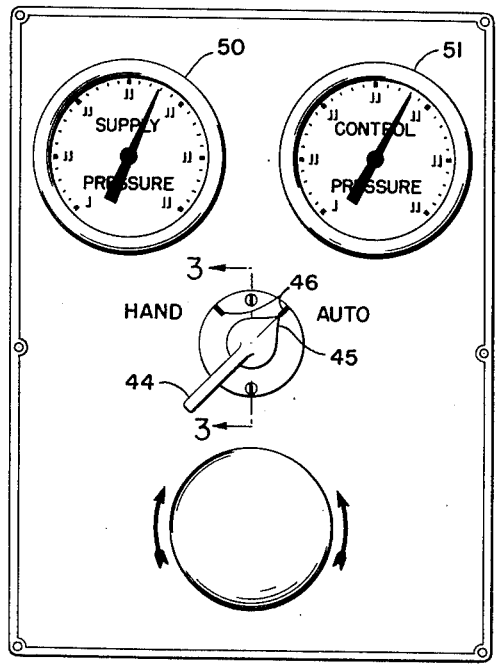
FIG. 1
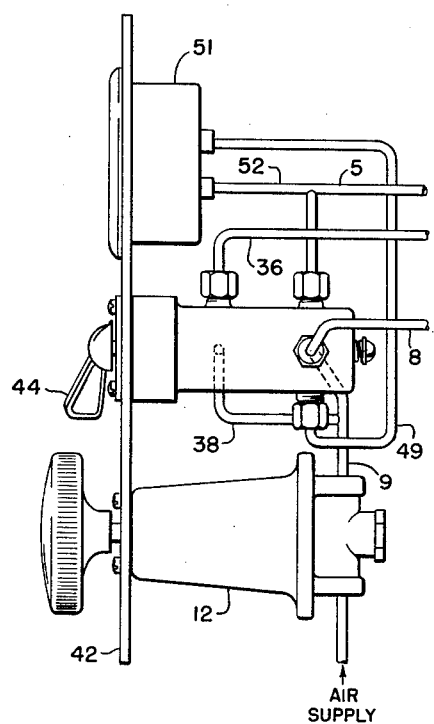
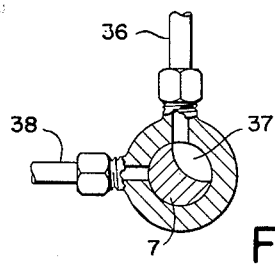
FIG. 2
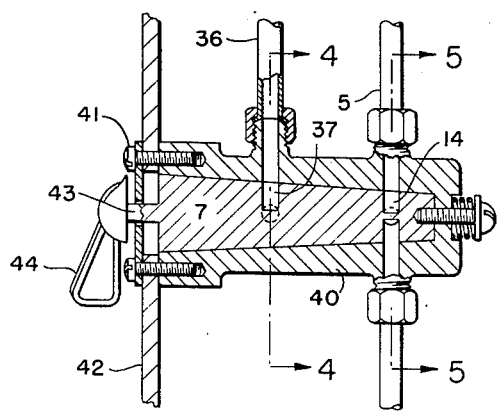
FIG. 3
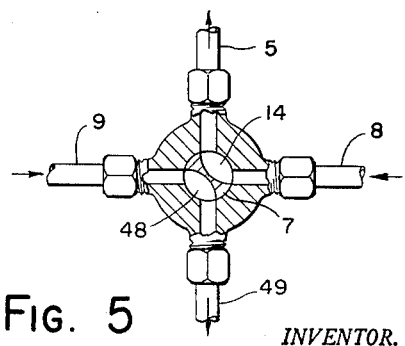
FIG. 5
INVENTOR.
JACK F. SHANNON
BY
Raymond W. Jenkins
ATTORNEY May 5, 1953          J. F. SHANNON          2,637,342
FLUID PRESSURE CONTROL Filed Oct. 22, 1948          3 Sheets-Sheet 2

INVENTOR.
JACK F. SHANNON
BY
Raymond W. Jenkins
ATTORNEY

May 5, 1953  J. F. SHANNON  2,637,342
FLUID PRESSURE CONTROL
Filed Oct. 22, 1948  3 Sheets-Sheet 3

INVENTOR.
JACK F. SHANNON
BY
Raymond W. Jenkins
ATTORNEY

Patented May 5, 1953

2,637,342

UNITED STATES PATENT OFFICE 2,637,342

FLUID PRESSURE CONTROL

Jack F. Shannon, Euclid, Ohio, assignor to Bailey Meter Company, a corporation of Delaware Application October 22, 1948, Serial No. 56,001

9 Claims. (Cl. 137—653)

This invention relates to control systems operable automatically or manually to maintain substantially constant any desired electrical, thermal, chemical, physical or other variable condition through the control of a corrective agent or agents. More particularly, my invention relates to control systems wherein a fluid pressure is utilized as the motive power for actuating devices to control the rate of application of corrective agents.

It is frequently necessary that a system be provided for regulating the supply of an agent effecting a condition, and the system should be operable either automatically in response to the condition for maintaining it at a desired constant value or manually for varying the condition as desired. The supply of the agent may be controlled by a device which is operated by fluid delivered at a pressure regulated by the system. When the system is switched from automatic to hand control or vice versa, the pressure supplied to the device immediately after the switch-over should be the same as the pressure supplied before the switch was made, otherwise an operation of the device may be obtained to vary the agent so as to upset the whole system. It is therefore desirable that means be provided for regulating the pressure that would be supplied as well as indicating both the supply and the control pressures.

An object of my invention is to provide an improved system for controlling a condition. Another object is to provide a system that may be adjusted for operation either automatically or manually to control a condition. Still another object is to provide an improved system in which a valve mechanism is selectively operative for supplying pressure fluid from automatic or manual control means to a regulating device, and separate gages are provided for indicating the supply and control pressures, the supply pressure gage indicating the pressure available at the control means not in control, and the control pressure gage indicating the pressure received by the regulating device. Other objects will appear in the course of the following description.

In the accompanying drawings there are shown for purposes of illustration two forms which my invention may assume in practice.

In these drawings:

Fig. 1 is a front elevational view of control apparatus embodied in my improved system.

Fig. 2 is a side elevational view of the apparatus shown in Fig. 1.

Fig. 3 is an enlarged vertical sectional view taken on the plane of the line 3—3 of Fig. 1.

Figs. 4 and 5 are vertical sections taken on the planes of the lines 4—4 and 5—5 of Fig. 3.

Figure 6:
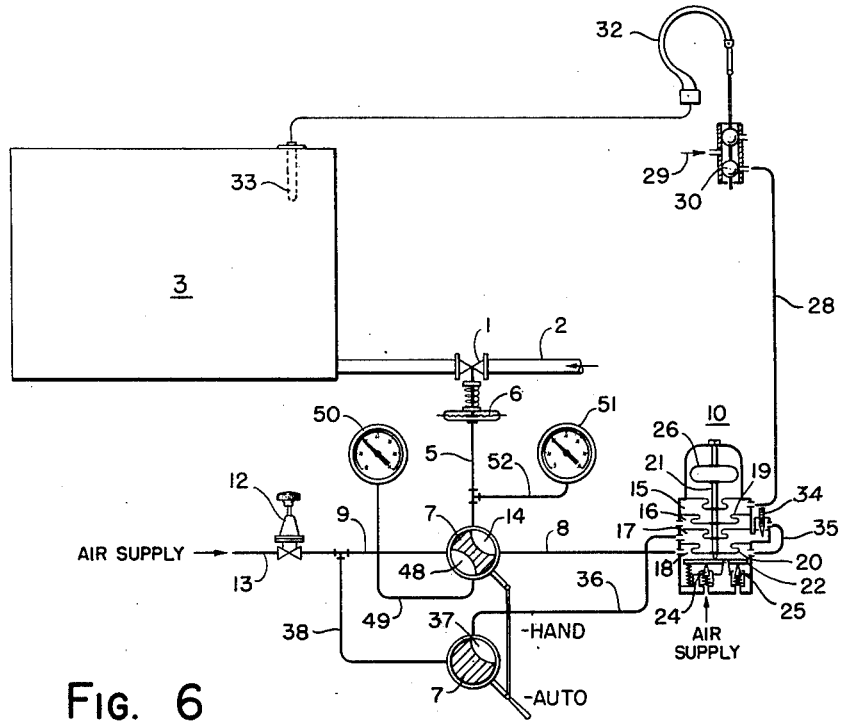

Fig. 6 is a schematic diagram of my improved control system adjusted for automatic operation.

Figure 7:
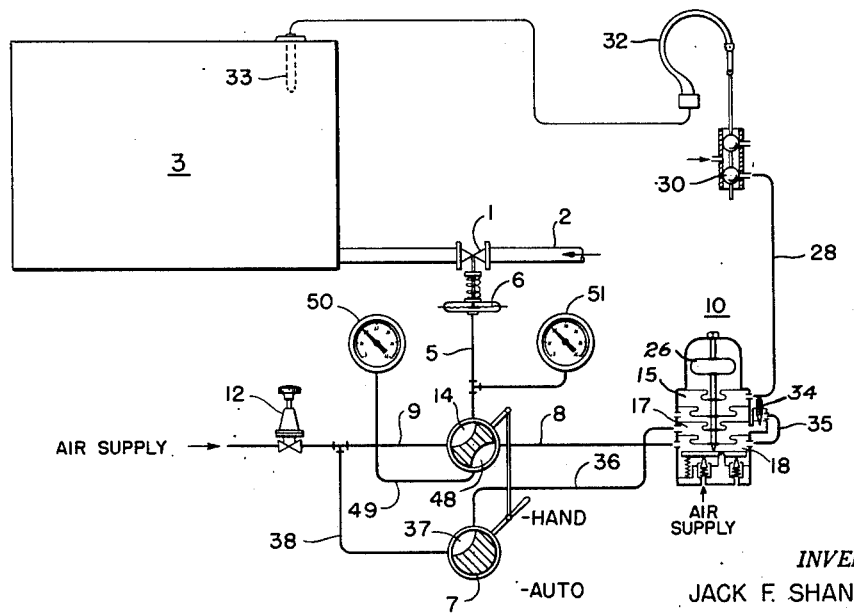

Fig. 7 is a schematic diagram like that of Fig. 6 but showing the system adjusted for hand operation.

Figure 8:
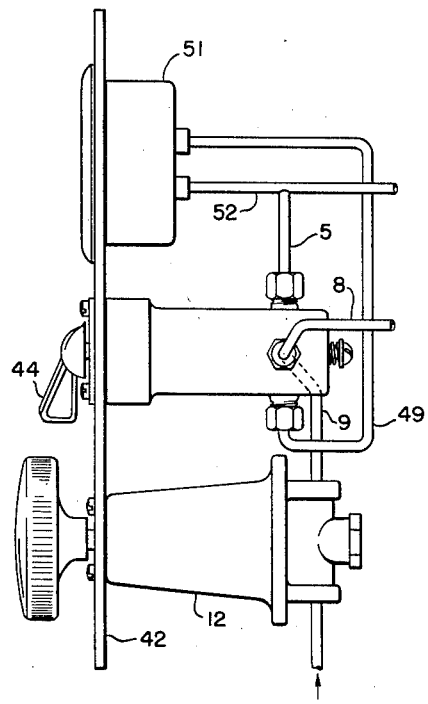

Fig. 8 is a side elevational view like that of Fig. 2 but showing apparatus for another form of my invention.

Figure 9:
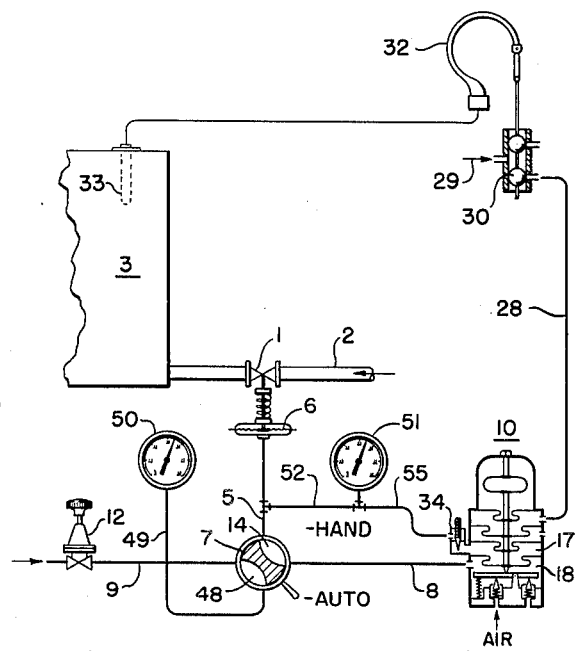
Figure 10:
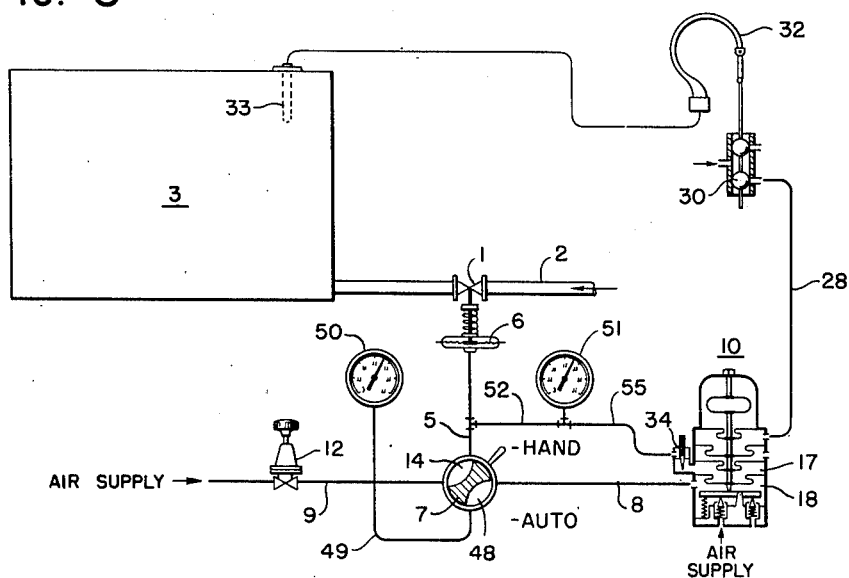

Figs. 9 and 10 are schematic diagrams showing the control systems for the apparatus of Fig. 8 adjusted for automatic and hand control.

Referring to the drawings, and more particularly to Figs. 6 and 7, it will be noted that my improved control system has been shown regulating the supply of pressure to a diaphragm actuated valve 1 for controlling the flow of fluid through a conduit 2 to a container 3 so as to either maintain a condition therein at a predetermined value or cause the condition to vary as desired. A conduit 5 communicates with the diaphragm 6 of the valve 1 and is adapted to be connected by a valve 7 selectively to fluid supply conduits 8 and 9. The valve 1 used in the system as shown is adapted to open on an increase in the pressure supplied to the diaphragm 6. A standardizing relay, generally designated 10 determines the pressure in the supply conduit 8, and a manually adjustable regulator 12 determines the pressure supplied from a source 13 to the supply conduit 9. With the valve 7 in the position shown in Fig. 6, the conduit 8 discharges pressure fluid through a groove 14 in the valve to the conduit 5, and the relay 10 operates to regulate the pressure supplied to the conduit 8 in response to changes in the condition within the container.

The relay 10 is like that disclosed in the Gorrie patent Re. 21,804 and comprises chambers 15, 16, 17 and 18, the chambers 15, 16 being separated by a flexible partition 19, and the chambers 17, 18 being separated by a flexible partition 20. An elongated member 21 is connected to the partitions 19, 20 and acts on a pivoted beam 22 for controlling the positions of intake and discharge valves 24 and 25. An adjustable spring 26 is connected to the member 21 and urges it away from the beam 22 to permit the latter to move in a direction for unseating the discharge valve 25. Communicating with the chamber 15 is a conduit 28 which is connected with a pressure supply 29 and with the atmosphere under the control of a pilot valve 30. A pressure responsive device 32, such as a Bourdon tube, is operatively connected to the pilot valve and is subjected to a pressure proportional to the condition by an element 33 which is sensitive to changes in the condition.

The condition to be controlled may be the temperature within the container 3, in which case the fluid supplied by the conduit 2 may be a heating fluid, such as steam. Instead of making the system responsive to temperature it could as well be made responsive to the pressure in the container, or to any other variable that it may be desired to control. The operation of the pilot valve 30 is such as to vary the pressure in the conduit 28 in inverse proportion to changes in the condition. If the valve I had been designed to close on an increase in the pressure supplied thereto then the pilot valve would be connected to vary the pressure in conduit 28 in direct proportion to changes in the condition. The pilot valve 30 is disclosed in the Johnson Patent 2,054,464 and need not be described in detail herein.

The chamber 16 of the relay is vented to atmosphere, and the chambers 17 and 18 are connected in communication through a restricting valve 34 and a conduit 35. A conduit 36 opens into the chamber 17 and is adapted to be connected through a groove 37 in the valve 7 to a conduit 38 branching from the supply conduit 9.

The valve 7, as shown in Fig. 3 is rotatably received within a valve housing 40 which is attached, as by screws 41, to a control panel 42. A reduced valve portion 43 projects through the panel and has attached thereto an operating handle 44 having a pointer 45 which cooperates with marks 46 (see Fig. 1) for indicating whether the valve is in "hand" or "automatic" control position. Formed in the valve 7 is a groove 48 for connecting the supply conduits 8 and 9 selectively to a conduit 49 communicating with a pressure gage 50. Another pressure gage 51 is connected by a conduit 52 in continuous communication with the conduit 5. When one of the conduits 8 and 9 is connected by the groove 48 to the gage 50, the other conduit is connected by the groove 14 to the diaphragm 6 and the gage 51.

When the valve 7 is in position for automatic control, as shown in Fig. 6, the groove 14 connects the conduits 5 and 8 for supplying a pressure determined by the relay 10 to the diaphragm 6, and the gage 51 indicates this pressure. The groove 48 connects the conduit 9 to the conduit 49 for indicating on the gage 50 the pressure available at the discharge side of the manually adjustable regulator 12, and the groove 37 is moved to a position for breaking the connection between the conduits 36 and 38. If the pressure supplied by the conduit 28 to the chamber 15 is equal to the tension of the spring 26, and the pressures in the chambers 17 and 18 are equal, then the relay 10 is balanced, and the pressure in the chamber 18 is supplied to the diaphragm 6 for holding the valve I in some partially open position. Any increase in the value of the condition will result in an operation of the pilot valve 30 to reduce the pressure supplied through the conduit 28 to the chamber 15. This will unbalance the relay so as to open the valve 25 and vent pressure from the chamber 18, thereby reducing the pressure supplied to the diaphragm 6 and effecting a closing movement of the valve I to reduce the flow of fluid to the container 3. The reduction of pressure in chamber 18 tends to rebalance the relay 10, but the pressure differential between chambers 17 and 18 results in a restricted flow of fluid from the chamber 17 to the chamber 18 and the unbalance of the relay is maintained as long as the pressure supplied to chamber 15 exerts a force less than that of the spring 26. A progressive reduction of the pressure supplied to the diaphram 6 therefore takes place to reduce the flow of fluid to the container 3 until the condition returns to the desired value and effects an increase of the pressure in the chamber 15 to balance the spring. If the condition drops below the desired value, the pilot valve is positioned to increase the pressure supplied to the chamber 15 until it exerts a force greater than that of the spring. The relay is then unbalanced to open the valve 24 and increase the pressure supplied to the diaphragm 6 for opening the valve I. The pressure in the relay chamber 18 continues to increase as long as the condition remains below the desired value.

If it is desired to regulate the pressure supplied to the diaphragm 6 by hand, the valve 7 is moved from the position of Fig. 6 to the position of Fig. 7. Before doing this, however, the device 12 is adjusted until the pressure at its discharge side, as indicated by the gage 50, is equal to the pressure supplied to the diaphragm from the relay 10. This prevents a sudden change in the supply of fluid to the container when the system is first put onto manual control. With the valve in the position of Fig. 7, the manually adjusted pressure is supplied both to the diaphragm 6 and to the chamber 17 of the relay 10. Since this pressure is equal to the pressure that was supplied from chamber 18 before the switch-over was made, then the relay remains balanced, and the pressure in the chamber 18 is applied to the gage 50 through the conduit 8, the valve groove 48, and the conduit 49 to indicate a value equal to the value indicated by the gage 51. If the device 12 is now adjusted to vary the pressure supplied to the diaphragm 6, the same pressure variation takes place in chamber 17 of the relay and effects operation of the latter to vary the pressure in the chamber 18 by an equal amount. Assuming that the pressure change on the diaphragm 6 produces no change in the temperature within tank 3, then the pressure on the diaphragm, as indicated by gage 51, and the pressure in chamber 18 of the relay, as indicated by gage 50, will be equal. Any change in the diaphragm pressure by adjustment of the device 12 will be accompanied by an equal change in pressure within the chamber 18 as long as the temperature within the tank remains constant. An opening of the valve I by an increase in diaphragm pressure effects in time, however, an increase in the temperature and an operation of the pilot valve 30 to reduce the pressure in the chamber 15 of the relay. The pressure drop in this chamber unbalances the relay to reduce the pressure in chamber 18 by an amount equal to the drop in chamber 15. There is then a difference between the pressures in chamber 17 and 18 and a restricted flow of fluid takes place between them, but this flow has no effect on the pressure in chamber 17 because the pressure is maintained therein at the value determined by the adjustment of the device 12. It also has no effect on the pressure in chamber 18, this pressure remaining at a value equal to the pressure in chamber 17 reduced by an amount equal to the drop in pressure within chamber 15. The gages 50 and 51 now indicate values differing from each other by an amount proportional to the change in the temperature from the value that is maintained by the relay 10 when on automatic control. As the temperature increases, the pointer of gage 50 drops below that of gage 51 by a proportionate amount, and a drop in the temperature below that which would be maintained automatically results in an increase in the reading of gage 50 over that of gage 51 by a proportionate amount.

If the operator wishes to return the system to automatic control without any immediate change in the fluid supplied to the container, he regulates the device 12 until the readings of the gages 50 and 51 are equal. When the reading of the gage 50 is below that of gage 51, the operator knows that the temperature is above the value at which the relay 10 would be balanced, so he adjusts the device 12 to reduce the pressure on the diaphragm 6 for effecting movement of the valve 1 toward its closed position. If the gage 50 reads above gage 51 he changes the adjustment of the device 12 to increase the pressure on the diaphragm 6. When the readings of the gages are equal, the pressure supplied from the pilot valve to the chamber 15 balances the spring 26 and the pressures in the chambers 17 and 18 are equal. The valve 7 may then be moved to the automatic control position without changing the position of the valve 1.

Figs. 9 and 10 show schematically an arrangement of apparatus which is a little more simple than that described above and which performs the same functions. In this arrangement the relay 10 and the device 12 determine the pressure supplied to the conduits 8 and 9 in the manner described above. The valve 7 is provided, however, with only the two grooves 14 and 48, the groove 14 connecting the conduits 5, 8 and the groove 48 connecting the conduits 9, 49, in the automatic control position of the valve. When the valve is in hand control position, the groove 14 connects the conduits 5, 9 while the groove 48 connects the conduits 8, 49. These connections are the same as in the first form of the invention. In place of the conduit 35 connecting the chambers 17 and 18 in the first form of the invention, there is provided a conduit 55 communicating with the chamber 17 through the restricting valve 34 and connected to the conduit 52. With the valve in the automatic control position, the chamber 17 communicates with the chamber 18 through the valve 34 and the conduits 55, 52, 5 and 8. When the valve is in the hand control position, communication between the chambers 17 and 18 is cut off and the pressure in the conduit 9 is delivered to the chamber 17 through the valve groove 14, the conduits 5, 52, 55 and the restricting valve 34. The operation of this form of the control system is the same as that of the first form in both the automatic and hand control positions.

While there are described in this application two forms which my invention may assume in practice, it will be understood that the invention may be modified and embodied in various other forms without departing from its spirit or the scope of the appended claims.

What I claim as new and desire to secure by Letters Patent of the United States, is:

1. A system for controlling a condition comprising, in combination, pressure responsive means for determining the condition, means operating in response to changes in the condition from a predetermined value for establishing a first pressure varying in value in one direction or the other dependent upon the direction of change in the condition, manually adjustable means for establishing a second pressure at any desired value, means for subjecting said pressure responsive means selectively to said first and second pressures, means including said selective means for changing the operation of said operating means only when said second pressure is subjected on said pressure responsive means so as to produce a third pressure varying directly with changes in the condition and with said second pressure, a pressure gage for indicating the pressure supplied to said pressure responsive means, and a second pressure gage operative to indicate said second pressure when said first pressure is supplied to said pressure responsive means and to indicate said third pressure when said second pressure is supplied to said pressure responsive means.

2. A system for controlling a condition comprising, in combination, pressure responsive valve means for regulating the flow of fluid determining the condition, means including a relay operating to establish a first pressure varying in value in response to changes in the condition from a predetermined value, manually adjustable means for establishing a second pressure at any desired value, a manually adjustable valve for subjecting said pressure responsive valve means selectively to said first and second pressures, means including said manually adjustable valve for subjecting only the second pressure on the means including a relay establishing said first pressure said relay operating when subjected to said second pressure to establish a third pressure proportional to the value of said condition and to said second pressure, a pressure gage for indicating the value of the pressure supplied to said pressure responsive valve means, a second pressure gage, and means including said manually adjustable valve for subjecting said second gage selectively to said second and third pressures.

3. The control system of claim 2 in which said last mentioned means is operative to subject said second gage to said second pressure when said manually adjustable valve is in a position to supply said first pressure to said pressure responsive valve means, and is operative to subject said second gage to said third pressure when said manually adjustable valve is in a position to supply said second pressure to said pressure responsive valve means.

4. A system for controlling a condition comprising, in combination, a relay having two pairs of chambers, the chambers of each pair separated by a flexible partition, means operatively connecting said partitions, supply and discharge valves regulating fluid flow relative to a chamber of one of said pairs under the control of said connecting means, means for connecting the chambers of said one of said pairs in restricted communication, means for subjecting a chamber of the other of said pairs to a pressure varying with changes in the condition, manually adjustable means for establishing a pressure at any desired value, pressure responsive means for determining the condition, valve means for subjecting said pressure responsive means selectively to the pressure in the chamber relative to which flow is regulated by said supply and discharge valves and to the pressure established by said manually adjustable means, and means for subjecting the chamber opposite the one relative to which fluid flow is regulated to the pressure established by said manually adjustable means when said pressure responsive means is subjected to the same pressure.

5. The system of claim 4 including a pressure gage subjected continuously to the pressure supplied to said pressure responsive means, a second pressure gage, and means for subjecting said second pressure gage to the pressure established by said manually adjustable means when said pressure responsive means is subjected to the pressure in the chamber relative to which flow is regulated and to the pressure in the chamber relative to which flow is regulated when said pressure responsive means is subjected to the pressure established by said manually adjustable means.

6. A system for controlling a condition comprising, in combination, a pressure chamber having a flexible wall, means providing a pair of pressure chambers separated by a common flexible wall, means connecting said walls together for simultaneous movement, a restricted connection between said pair of chambers, supply and discharge valves regulating fluid flow relative to one of said pair of chambers under the control of said connecting means, means for subjecting said first mentioned chamber to a pressure varying with changes in the condition, manually adjustable means for establishing a pressure at any desired value, pressure responsive means for determining the condition, adjustable valve means for subjecting said pressure responsive means selectively to the pressure in the one of said pair of chambers relative to which flow is regulated by said supply and discharge valves and to the pressure established by said manually adjustable means, and means for subjecting the other of said pair of chambers to the pressure established by said manually adjustable means when said pressure responsive means is subjected to the same pressure.

7. A system for controlling a condition comprising, in combination, a pressure chamber having a flexible wall, means providing a pair of pressure chambers separated by a common flexible wall, means connecting said walls together for simultaneous movement, supply and discharge valves regulating fluid flow relative to one of said pair of chambers under the control of said connecting means, means for subjecting said first mentioned chamber to a pressure varying with changes in the condition, manually adjustable means for establishing a pressure at any desired value, pressure responsive means for determining the condition, adjustable valve means for subjecting said pressure responsive means selectively to the pressure in the one of said pair of chambers relative to which flow is regulated by said supply and discharge valves and to the pressure established by said manually adjustable means, means controlled by said adjustable valve means and adapted to connect said pair of chambers in restricted communication when said adjustable valve means is in a position to subject said pressure responsive means to the pressure in said one of said pair of chambers, and means controlled by said adjustable valve means and adapted to subject the other one of said pair of chambers to the pressure established by said manually adjustable means when said adjustable valve means is in a position to subject said pressure responsive means to the same pressure.

8. The system of claim 7 including a pressure gage subjected to the pressure supplied said pressure responsive means, a second pressure gage, means for subjecting said second pressure gage to the pressure established by said manually adjustable means when said pressure responsive means is subjected to the pressure in one of said pair of chambers, and means for subjecting said second pressure gage to the pressure in said one of said pair of chambers when said pressure responsive means is subjected to the pressure established by said manually adjustable means.

9. A system for controlling a condition comprising, fluid pressure responsive valve means for controlling an agent of the condition, means establishing a first fluid pressure representative of the condition, means sensitive to the first fluid pressure establishing a control fluid pressure representative of a deviation in the first fluid pressure from a desired value, manually adjustable means for establishing a second fluid pressure at a desired value, manually operated valve means with ports subjecting the fluid pressure responsive valve means selectively to the second fluid pressure and the control fluid pressure, valve ports in said manually operated valve means for establishing the second fluid pressure in the means sensitive to the first fluid pressure so that said sensitive means will produce an output fluid pressure varying directly with the first and second fluid pressures, a pressure gage for indicating the pressure supplied to the fluid pressure responsive valve, and a second pressure gage operative to indicate the second pressure when the control pressure is supplied to the fluid pressure responsive valve and to indicate the output pressure when the second pressure is supplied to the fluid pressure responsive valve.

JACK F. SHANNON.

References Cited in the file of this patent

UNITED STATES PATENTS

| Number | Name | Date |
|---|---|---|
| Re. 21,804 | Gorrie | May 20, 1941 |
| 2,202,485 | Fitch | May 28, 1940 |
| 2,369,887 | Eckman | Feb. 20, 1945 |
| 2,476,104 | Mason | July 12, 1949 |

FOREIGN PATENTS

| Number | Country | Date |
|---|---|---|
| 458,823 | Great Britain | Dec. 28, 1936 |